United States Patent
Di Monte

(10) Patent No.: US 12,234,928 B2
(45) Date of Patent: Feb. 25, 2025

(54) LOCKING MECHANISM FOR SEALING MEMBER OF VALVE WITH BLEEDING OPENING

(71) Applicant: Michael Anthony Di Monte, Howell, NJ (US)

(72) Inventor: Michael Anthony Di Monte, Howell, NJ (US)

( * ) Notice: Subject to any disclaimer, the term of this patent is extended or adjusted under 35 U.S.C. 154(b) by 35 days.

(21) Appl. No.: 18/127,354

(22) Filed: Mar. 28, 2023

(65) Prior Publication Data

US 2023/0235824 A1 Jul. 27, 2023

Related U.S. Application Data

(63) Continuation-in-part of application No. 17/701,631, filed on Mar. 22, 2022, now abandoned, and a continuation-in-part of application No. 17/330,056, filed on May 25, 2021, now Pat. No. 11,674,608, said application No. 17/701,631 is a continuation of application No. 17/207,891, filed on Mar. 22, 2021, now Pat. No. 11,313,478, which is a continuation of application No. 16/846,275, filed on Apr. 11, 2020, now Pat. No. 10,982,778, said application No. 17/330,056 is a continuation of application No. 16/734,339, filed on Jan. 5, 2020, which is a continuation of application No. 15/788,829, filed on Oct. 20, 2017, now Pat. No. 10,557,557, said
(Continued)

(51) Int. Cl.
*F16K 5/12* (2006.01)
*F16K 24/06* (2006.01)
*F16K 27/04* (2006.01)
*F16K 39/04* (2006.01)
*F16L 55/13* (2006.01)

(52) U.S. Cl.
CPC .............. *F16K 5/12* (2013.01); *F16K 24/06* (2013.01); *F16K 27/04* (2013.01); *F16K 39/04* (2013.01); *F16L 55/13* (2013.01)

(58) Field of Classification Search
CPC ............. F16K 5/12; F16K 17/19; F16K 24/06
See application file for complete search history.

(56) References Cited

U.S. PATENT DOCUMENTS 1,724,878 A * 8/1929 Jensen .................... F16K 17/36
220/745
2,018,130 A * 10/1935 Jauch ...................... F16K 15/02
137/503

(Continued)

*Primary Examiner* — Reinaldo Sanchez-Medina

(57) ABSTRACT

An apparatus for locking a sealing member of a valve in a piping system or an enclosed system comprises: (a) a locking mechanism housing having a upper end, a lower end opposed to the upper end, and a body between the upper end and the lower end; (b) at least a locking mechanism opening formed on the body; (c) at least a locking mechanism disposed in the locking mechanism opening; (d) a valve housing bleeder opening, wherein the valve further comprises a valve housing and a sealing member; wherein the locking mechanism housing, the at least a locking mechanism opening, at least a locking mechanism, and the sealing member is disposed inside the valve housing; wherein a first pressure exists in the upper end of the locking mechanism housing; and wherein a second pressure exists in the lower end of the locking mechanism housing.

5 Claims, 11 Drawing Sheets

Related U.S. Application Data application No. 16/846,275 is a continuation of application No. 15/675,818, filed on Aug. 14, 2017, now Pat. No. 10,655,739, said application No. 15/788,829 is a continuation-in-part of application No. 15/675,818, filed on Aug. 14, 2017, now Pat. No. 10,655,739, and a continuation-in-part of application No. 15/299,446, filed on Oct. 20, 2016, now abandoned, which is a continuation-in-part of application No. 15/293,315, filed on Oct. 14, 2016, now Pat. No. 9,657,468, which is a continuation-in-part of application No. 15/275,419, filed on Sep. 25, 2016, now Pat. No. 10,030,372, which is a continuation-in-part of application No. 15/246,464, filed on Aug. 24, 2016, now Pat. No. 9,926,691, which is a continuation-in-part of application No. 15/132,131, filed on Apr. 18, 2016, now Pat. No. 9,797,120.

(60) Provisional application No. 62/544,875, filed on Aug. 13, 2017, provisional application No. 62/543,267, filed on Aug. 9, 2017, provisional application No. 62/540,705, filed on Aug. 3, 2017, provisional application No. 62/538,701, filed on Jul. 30, 2017, provisional application No. 62/538,499, filed on Jul. 28, 2017.

(56) References Cited

U.S. PATENT DOCUMENTS

| | | | | |
|---|---|---|---|---|
| 2,803,423 | A * | 8/1957 | Erling | F16K 24/06 137/496 |
| 3,870,066 | A * | 3/1975 | Jurasek | F16K 24/06 137/519 |
| 4,535,807 | A * | 8/1985 | Ericson | E03C 1/122 137/526 |
| 4,991,623 | A * | 2/1991 | Ericson | E03C 1/1225 137/526 |
| 6,176,257 | B1 * | 1/2001 | Shen | F04D 13/16 137/895 |
| 6,532,988 | B1 * | 3/2003 | Ericson | E03C 1/1225 137/526 |
| 7,886,765 | B2 * | 2/2011 | Chalich | F16K 15/03 137/526 |
| 10,655,739 | B2 * | 5/2020 | Di Monte | F16K 39/04 |
| 10,982,778 | B2 * | 4/2021 | Di Monte | F16K 27/04 |
| 11,313,478 | B2 * | 4/2022 | Dimonte | F16K 27/04 |
| 2008/0029164 | A1 * | 2/2008 | Ciochetti | F16K 24/06 137/526 |

* cited by examiner

LOCKING MECHANISM FOR SEALING MEMBER OF VALVE WITH BLEEDING OPENING

CROSS-REFERENCE RELATED TO RELATED APPLICATIONS

The current application is a continuation-in-part application claiming the benefit and priority of a U.S. patent application Ser. No. 17/701,631, filed Mar. 22, 2022. U.S. patent application Ser. No. 17/701,631 is a continuation application claiming the benefit and priority of U.S. patent application Ser. No. 17/207,891, filed Mar. 22, 2021, patented, U.S. Pat. No. 11,313,478. U.S. patent application Ser. No. 17/207,891 is a continuation application claiming the benefit and priority of U.S. patent application Ser. No. 16/846,275, filed Apr. 11, 2020, patented, U.S. Pat. No. 10,982,778. U.S. patent application Ser. No. 16/846,275 is a continuation application claiming the benefit and priority of U.S. patent application Ser. No. 15/675,818, filed Aug. 14, 2017, patented, U.S. Pat. No. 10,655,739. U.S. patent application Ser. No. 15/675,818 claims benefit and priority from U.S. Provisional Application No. 62/544,875, filed Aug. 13, 2017; U.S. Provisional Application No. 62/543,267, filed Aug. 9, 2017; U.S. Provisional Application No. 62/540,705, filed Aug. 3, 2017; U.S. Provisional Application No. 62/538,701, filed Jul. 30, 2017; and U.S. Provisional Application No. 62/538,499, filed Jul. 28, 2017. All the above-listed prior applications are incorporated by reference entirely herein.

The current application is also a continuation-in-part application claiming the benefit and priority of a U.S. patent application Ser. No. 17/330,056, filed May 25, 2021. U.S. patent application Ser. No. 17/330,056 is a continuation application claiming the benefit and priority of U.S. patent application Ser. No. 16/734,339, filed Jan. 5, 2020. U.S. patent application Ser. No. 16/734,339 is a continuation application claiming the benefit and priority of U.S. patent application Ser. No. 15/788,829, filed Oct. 20, 2017, patented, U.S. Pat. No. 10,557,557. U.S. patent application Ser. No. 15/788,829 is a continuation-in-part application claiming the benefit and priority of U.S. patent application Ser. No. 15/675,818, filed Aug. 14, 2017, patented, U.S. Pat. No. 10,655,739. U.S. patent application Ser. No. 15/788,829 is a continuation-in-part application claiming the benefit and priority of U.S. patent application Ser. No. 15/299,446, filed Oct. 20, 2016. U.S. patent application Ser. No. 15/299,446 is a continuation-in-part application claiming the benefit and priority of U.S. patent application Ser. No. 15/293,315, filed Oct. 14, 2016, patented, U.S. Pat. No. 9,657,468. U.S. patent application Ser. No. 15/293,315 is a continuation-in-part application claiming the benefit and priority of U.S. patent application Ser. No. 15/275,419, filed Sep. 25, 2016, patented, U.S. Pat. No. 10,030,372. U.S. patent application Ser. No. 15/275,419, is a continuation-in-part application claiming the benefit and priority of U.S. patent application Ser. No. 15/246,464, filed Aug. 24, 2016, patented, U.S. Pat. No. 9,926,691. U.S. patent application Ser. No. 15/246,464 is a continuation-in-part application claiming the benefit and priority of U.S. patent application Ser. No. 15/132,131, filed Apr. 18, 2016, patented, U.S. Pat. No. 9,797,120. All the above-listed prior applications are incorporated by reference entirely herein.

BACKGROUND

The locking and unlocking device and mechanisms are known to be used, for example, electronic locks and pneumatic locks, for opening or closing systems. For valves that regulate positive or negative pressures in the piping system by admitting air flow or liquid flow, a problem is that there is no device or system that can prove negative or vacuum pressure exists within an environment before actuating an unlocking mechanism without the use of electronics. Another problem is that the sealing members of the valves may act prematurely when there is no situations to react to desired pressures.

BRIEF SUMMARY OF THE INVENTION

This Brief Summary is included so as to introduce, in an abbreviated form, various topics to be elaborated upon below in the Detailed Description. This Brief Summary is not intended to identify key or essential aspects of the claimed invention. This brief Summary is similarly not intended for use as an aid in determining the scope of the claims. The subject matters of this application overcomes the aforementioned problems and is directed to an apparatus for locking a sealing member of a valve in a piping system or an enclosed system comprises: (a) a locking mechanism housing having a upper end, a lower end opposed to the upper end, and a body between the upper end and the lower end; (b) at least a locking mechanism opening formed on the body; (c) at least a locking mechanism disposed in the locking mechanism opening; wherein the valve further comprises a valve housing and a sealing member; wherein the locking mechanism housing, the at least a locking mechanism opening, at least a locking mechanism, and the sealing member is disposed inside the valve housing; wherein a first pressure exists in the upper end of the locking mechanism housing; and wherein a second pressure exists in the lower end of the locking mechanism housing.

BRIEF DESCRIPTION OF THE DRAWINGS

It should be understood that the drawings are merely representative, are not necessarily drawn to scale, and are not intended to limit the subject matter of this application.

DETAILED DESCRIPTION

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Figure 1:
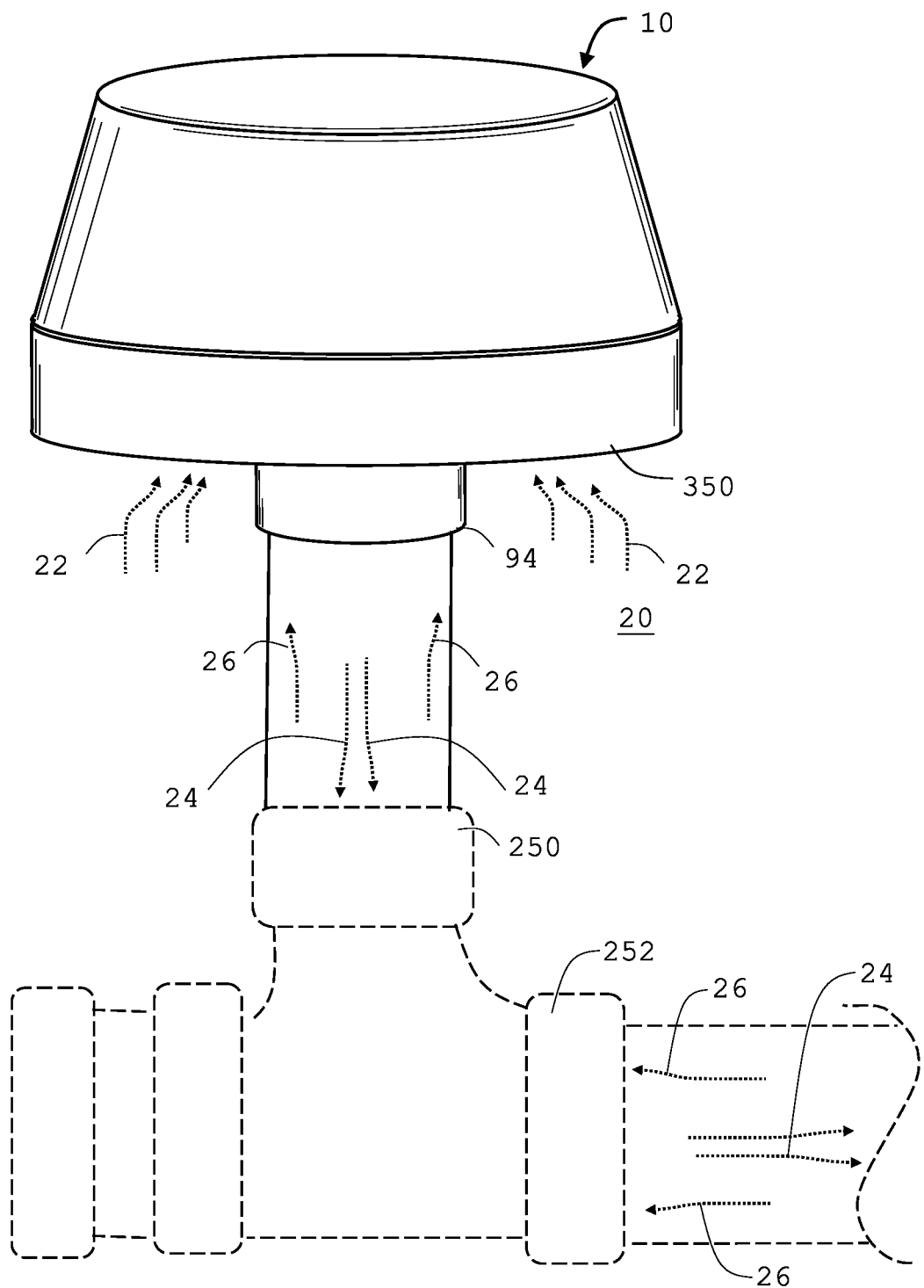
FIG. 1 is a perspective view of one of the embodiments of the invention.
Figure 2:
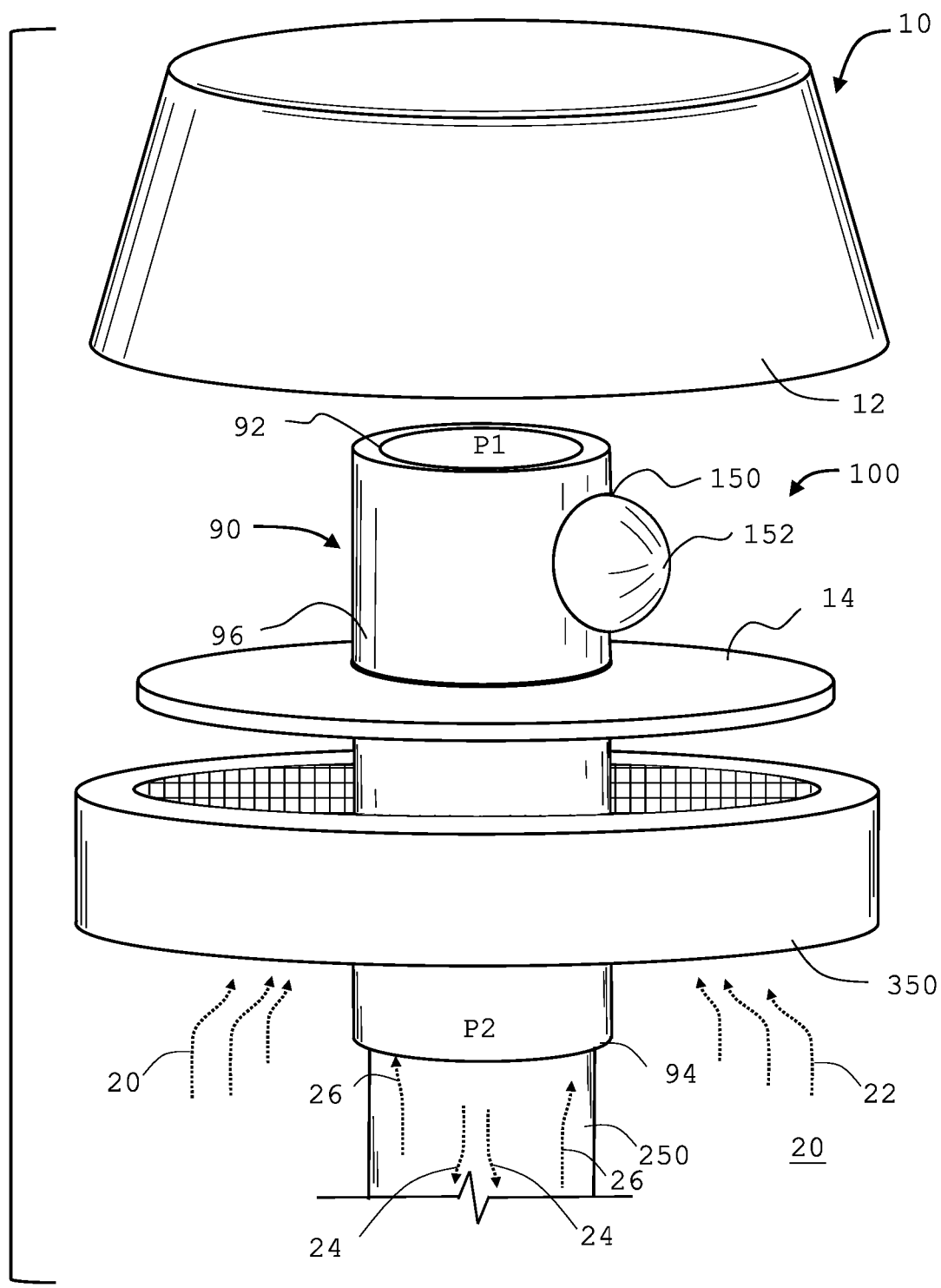
FIG. 2 is a perspective, exploded view of one of the embodiments of the invention.

Referring to FIGS. 1 and 2, one embodiment of an apparatus 100 for locking a valve 10 in a piping system 252 or an enclosed system (not shown) comprises a locking mechanism housing 90 having a upper end 92, a lower 94 end opposed to the upper end 92, and a body 96 between the upper end and 92 the lower end 94; (b) at least a locking mechanism opening 150 formed on the body 96; (c) at least a locking diaphragm 152 disposed in the locking mechanism opening 150; wherein the valve 10 further comprises a valve housing 12 and a sealing member 14; wherein the locking mechanism housing 90, the at least a locking mechanism opening 150, at least a locking diaphragm 152, and the sealing member 14 is disposed inside the valve housing 12; wherein a first pressure P1 exists in the upper end 92 of the locking mechanism housing 90; and wherein a second pressure P2 exists in the lower end 94 of the locking mechanism housing 90.

Also referring to FIGS. 1 and 2, in one embodiment, the upper end 92 of the locking mechanism housing 90 may communicate with the inlet 350 of the valve 10.

Figure 3:
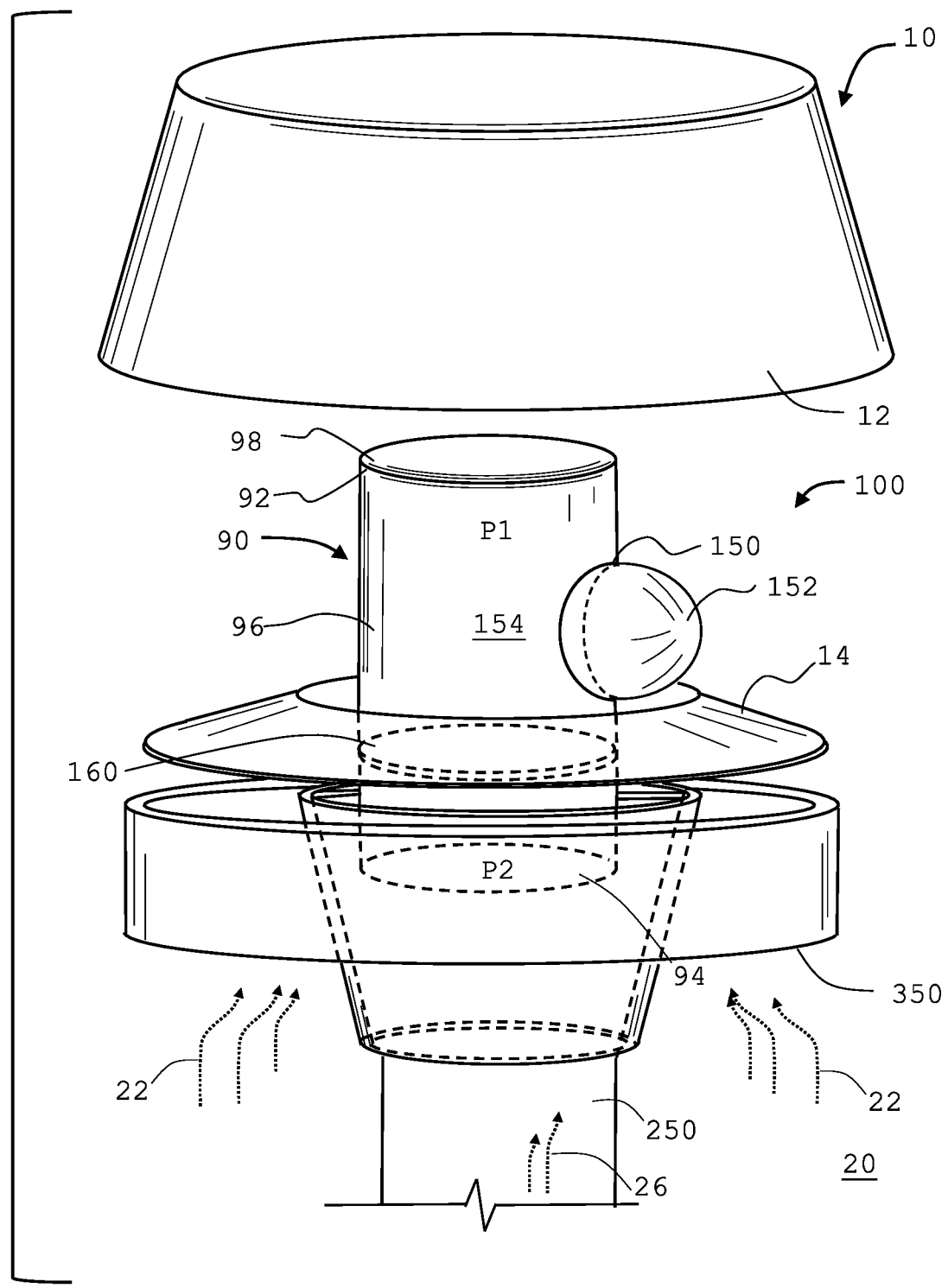
FIG. 3 is another perspective, exploded view of one of the embodiments of the invention.
Figure 4:
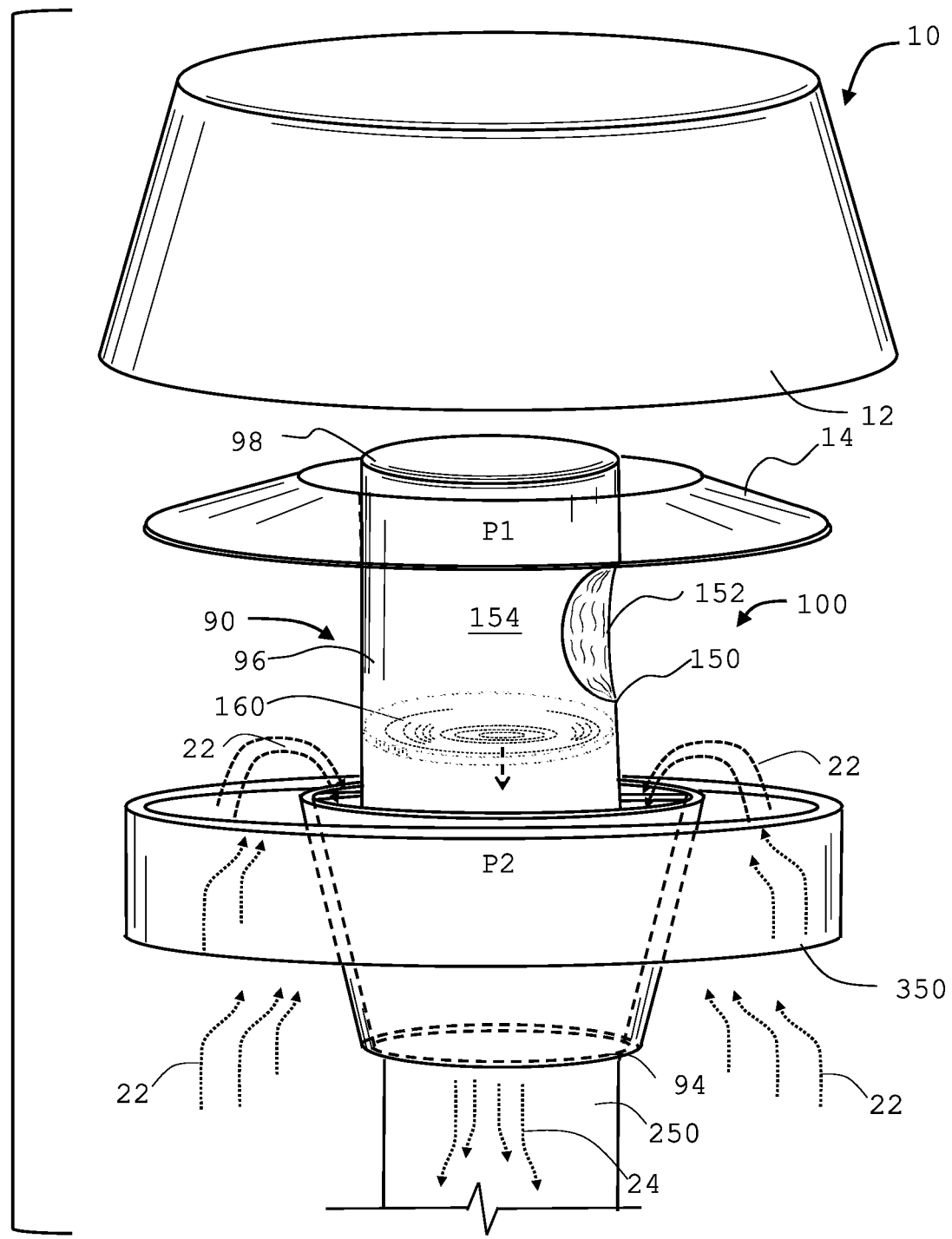
FIG. 4 is another perspective, exploded view of one of the embodiments of the invention.

Referring to FIGS. 3 and 4, in one embodiment of the apparatus 100 further comprises a locking mechanism housing end 98 enclosed on the upper end 92, a compression diaphragm 160 below the locking mechanism opening 150 and sealed inside the locking mechanism housing 90, and wherein an enclosed zone 154, or alternatively P1 zone, is defined by the locking mechanism housing end 98 the locking mechanism housing 90, and the compression diaphragm 160, wherein the first pressure P1 is inside the enclosed zone 154, wherein the second pressure P2 is outside the enclosed zone 154, wherein the compression diaphragm 160 moves outwardly to the enclosed zone 154 when the first pressure P1 is greater than the second pressure P2, and wherein the compression diaphragm 160 moves outwardly against the enclosed zone 154 when the first pressure P1 is greater than the second pressure P2. In one embodiment, wherein the enclosed zone can further comprises a noble gas.

Also referring to FIGS. 1 and 2, in one of the embodiment of the apparatus 10, the valve 10 further comprises an inlet 350 for communication with ambient environment 20, a sealing member 14 to prohibit the admittance of the ambient air flow 22, and an outlet 250 for communication with the piping system 252 or the enclosed system; and wherein the lower end 94 of the locking mechanism housing 90 communicates with the outlet 250 of the valve 10. The valve 10 is not limited to the type of valve presented in the figures. The location of the locking mechanism housing 90 is not limited to be in the center or near center of the sealing member 14. In one embodiment, the sealing member 14 may be in a disc plate near the center of the housing of the valve. In that type of the valve, the locking mechanism housing 90 may be located on one side of the valve and adjacent to the peripheral side of the sealing member 14. The outlet 250 between the valve 10 and the piping system 252, the connection between the valve 10 with the outlet 250, or the locking mechanism housing 90 to the valve 10, or the locking mechanism housing 90 to the piping system 252 may be by any type of connection used in the field, such as but not limited to fastener, treaded pipe, solvent welding, soldering, brazing, welding compression fittings, or crimped.

Also referring to FIGS. 3 and 4, in one of the embodiment of the apparatus, it is illustrated that the apparatus may provide a mechanism to ensure a negative second pressure P2 (relatively to ambient air pressure) existing in the piping system 252 or an enclosed system before sealing member 14 is lifted to allow the communication of the ambient and the piping system. The apparatus may also provide a visual indication of the existence of the negative second pressure P2. Referring to FIG. 3, there is an ambient air flow 22 from the ambient environment 20 pushes the sealing member 14 up; however, it may be premature to lift the sealing member 14 since there is no negative second pressure P2 existing in the valve or in the outlet 250 at the moment. This premature lift of the sealing member 14 will cause the foul air flow 26 to escape from the piping system 252 into the ambient environment 20, if there is no apparatus providing a locking mechanism to ensure a negative second pressure P2 before allowing the sealing member 14 is lifted. As referred to FIG. 3, in one embodiment, when apparatus 100 is in place, wherein the apparatus 100 further comprises a locking diaphragm 152 sealed around the locking mechanism opening 150, wherein the locking diaphragm 152 is configured to form a curvature outward the locking mechanism housing 150 and is above the sealing member 14 of the valve 10, which may limit the upward movement of the sealing member 14. The locking diaphragm 152 may not move inwardly to the locking mechanism opening 150 when there is no negative second pressure P2 or a positive P2 exists and pushes an increase of pressure in P1 zone 154 that further pushes the locking diaphragm 152 to move outwardly from the locking mechanism opening 150.

In the illustration shown in FIG. 4, in one embodiment of the apparatus 100, there is a negative second pressure P2 in the outlet 250 or in the piping system 252. The negative second pressure P2 produces a negative piping air flow 24, which will pull the compression membrane 160 downwardly and further decrease the first pressure P1 in the pressure zone allowing the locking diaphragm 152 to move inwardly to the locking mechanism opening 150. At the same time, the pressure difference between the negative second pressure P2 in the piping system and the ambient environment may lift the sealing member 14 upwardly. At current illustration, the recessed locking diaphragm 152 may not prevent the sealing member to travel up so that the ambient air flow 22, though the inlet 350, will be able to enter to the valve 10, and further enters into the outlet 250 or the piping system 252 (not shown). The recession of the locking diaphragm 152 will also provide an indication of the existence of a negative second pressure P2 or a piping air flow 24.

Figure 5:
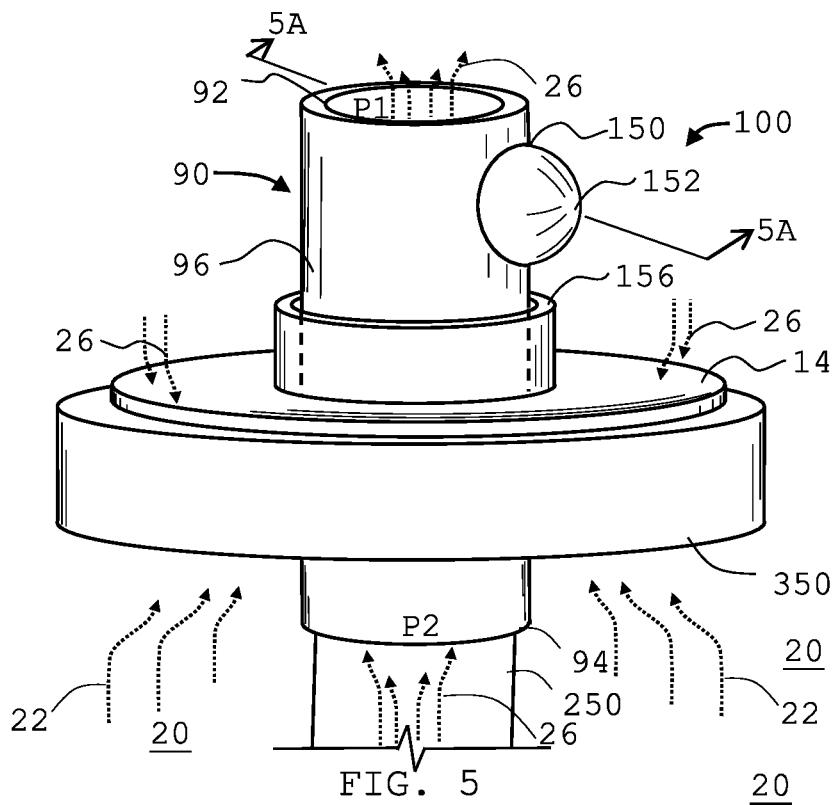
FIG. 5 is another perspective view of one of the embodiments of the invention when in locking status.
Figure 5A:
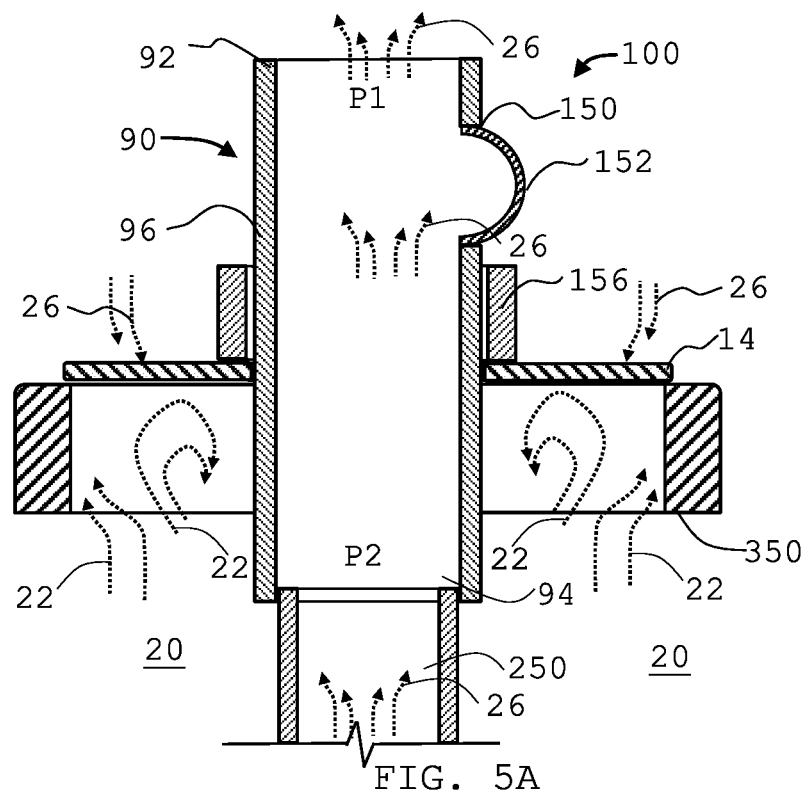
FIG. 5A is a sectional view of one of the embodiments of the invention shown in FIG. 5.

Now referring to FIGS. 5 and 5A, another one embodiment of the apparatus 100 shows that the valve 10 further comprises an inlet 350 for communication with ambient environment 20, a sealing member 14 to prohibit the admittance of the ambient air flow 22, and an outlet 250 for communication with the piping system 252 or the enclosed system; wherein the upper end 92 of the locking mechanism housing 90 communicates with the inlet 350 of the valve 10;

and wherein the lower end 94 of the locking mechanism housing 90 communicates with the outlet 250 of the valve 10.

Also referring to FIGS. 5 and 5A, in one embodiment of the apparatus 100, wherein the locking mechanism further comprises a locking diaphragm 152 sealed around the locking mechanism opening 150, wherein the locking diaphragm 152 is configured to form a curvature outward the locking mechanism housing 90 and is above the sealing member 14 of the valve 10, and wherein the curvature moves toward to the locking mechanism opening when the locking diaphragm 152 moves inwardly to the locking mechanism opening 150. In one embodiment, the apparatus may also comprise a collar guide 156 slidable relatively along an external wall of the locking mechanism housing 90, wherein the collar guide 156 is configured to be have a height above the sealing member 14 of the valve 10 but below the locking mechanism opening 150, and wherein the collar guide 156 moves when the sealing member 14 of the valve 10 moves.

As illustrated in FIGS. 5 and 5A, there is a positive second pressure P2 exists in the piping system and the outlet 250 due to the foul air flow 26. Because the positive second pressure P2 pushes the locking diaphragm 152 outwardly against the locking mechanism housing 90 and out of the locking mechanism opening 150, the locking diaphragm now locks and prevents the movement of the sealing member 14. When the sealing member 14 is locked, even there is ambient air flow 22 tries to lift the sealing member 14, the sealing member 14 will not be lifted. This will prevent a premature lift and prevent the foul air flow 26 from escaping the valve. This locking mechanism also prevents the sealing member 14 to tilted or slide open to sideway due to the tilted valve.

Figure 6:
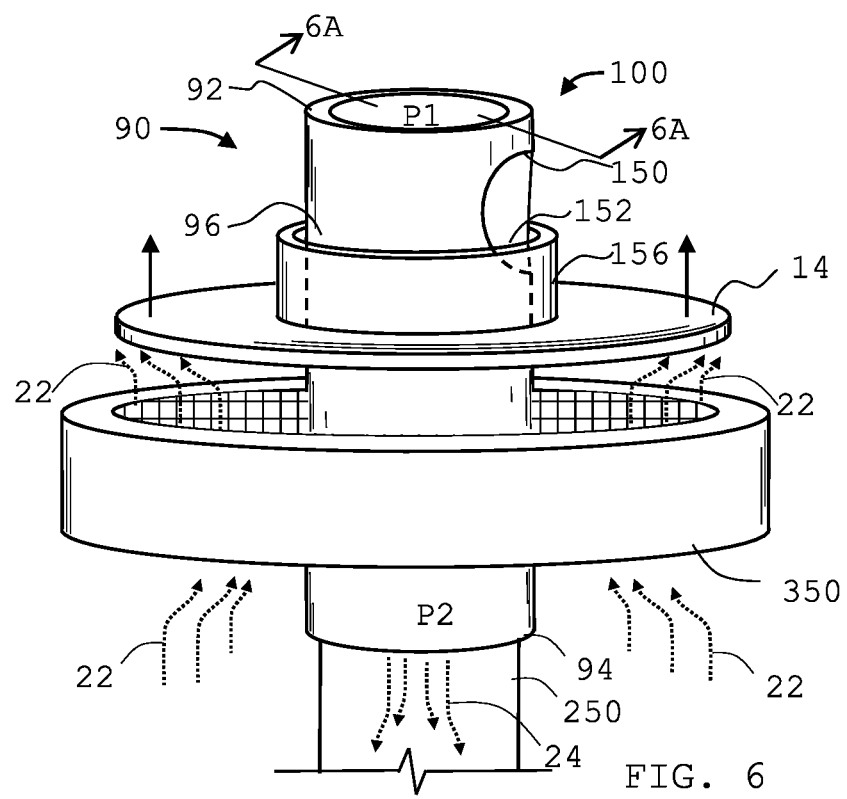
FIG. 6 is another perspective view of one of the embodiments of the invention when in locking status.
Figure 6A:
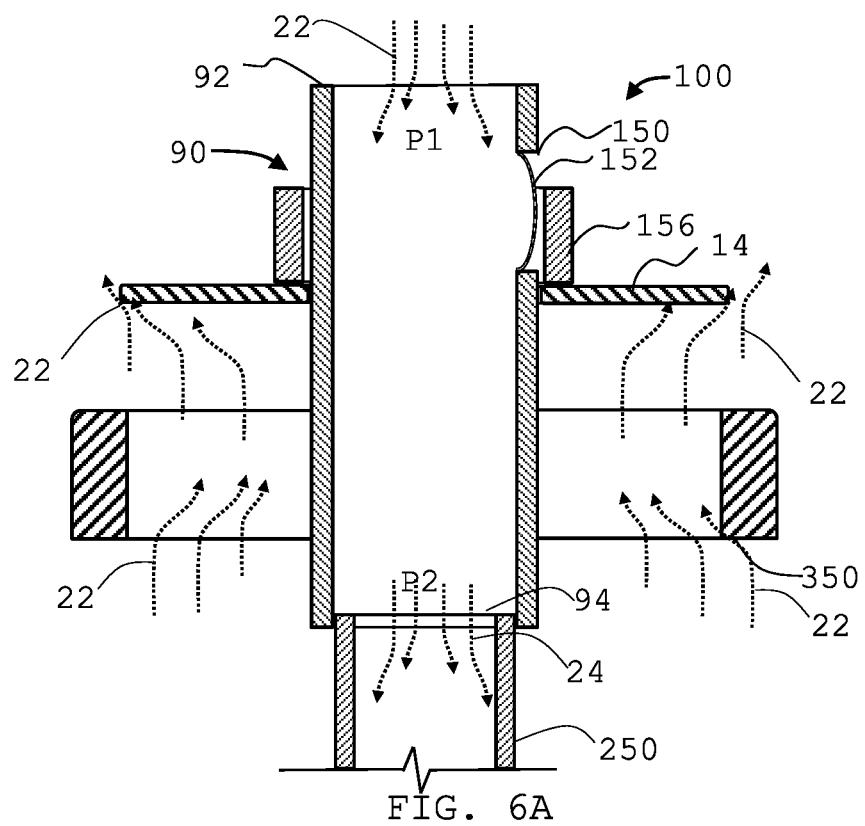
FIG. 6A is a sectional view of one of the embodiments of the invention shown in FIG. 6.

Now referring to FIGS. 6 and 6A, in one embodiment of the apparatus 100, there is a piping air flow 24 dawn down to the piping system 252, which will cause a negative second pressure P2 and a pressure drop in the locking mechanism opening 150 due to Venturi effect or an energy balance between the flow velocities and the pressures P1, P2, and the pressure in the locking mechanism opening 50. This drop of pressure in the locking mechanism opening 150 will suck the locking diaphragm 152 to move toward the locking mechanism opening 150. The curvature will retreat into the locking mechanism opening 150 or be flattened. Therefore, the locking mechanism is in a unlock status. The sealing member now can move upwardly because the ambient air flow 22 produces an uplifting force caused by the difference between the negative pressures P1 and P2 and the positive pressure in the ambient environment.

Also shown in the FIGS. 5, 5A, 6, and 6A, the collar guide 156 will move up when the sealing member 14 moves up, and block the locking diaphragm 152 to pop back. The collar guide 156 will remain to block the locking diaphragm 152 as long as the sealing member 14 is in a lifted status. This may prevent the locking diaphragm 152 to accidentally pop back during the admittance of the ambient air. When the pressures in the piping system become balanced or backs to positive, the sealing member 14 may drop back on the inlet. Under such conditions, the locking diaphragm 152 may pop out the locking mechanism opening 150 to a locking status (FIG. 5).

Figure 7:
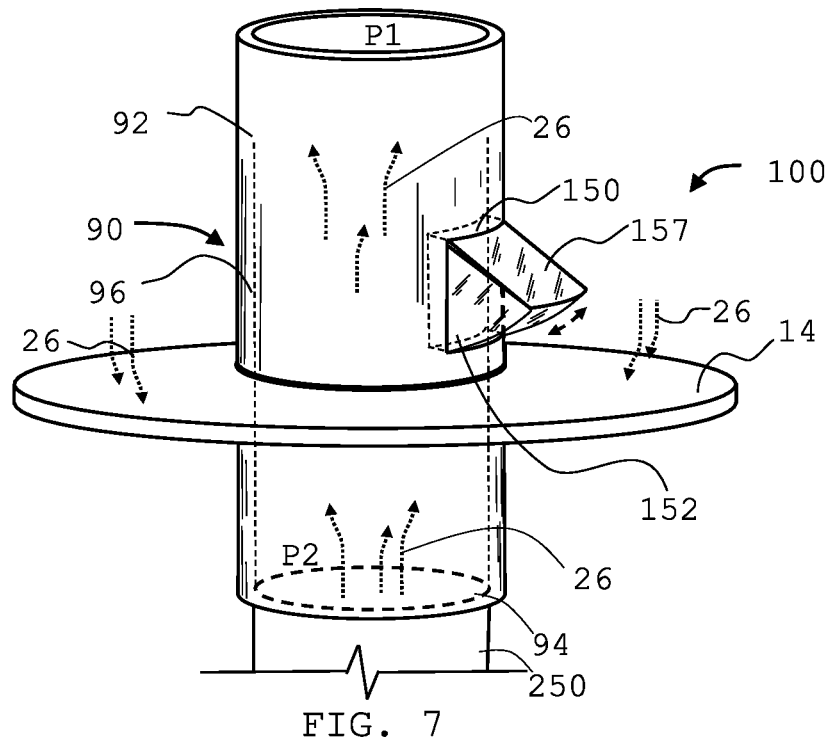
FIG. 7 is another perspective view of one of the embodiments of the invention when in locking status.
Figure 8:
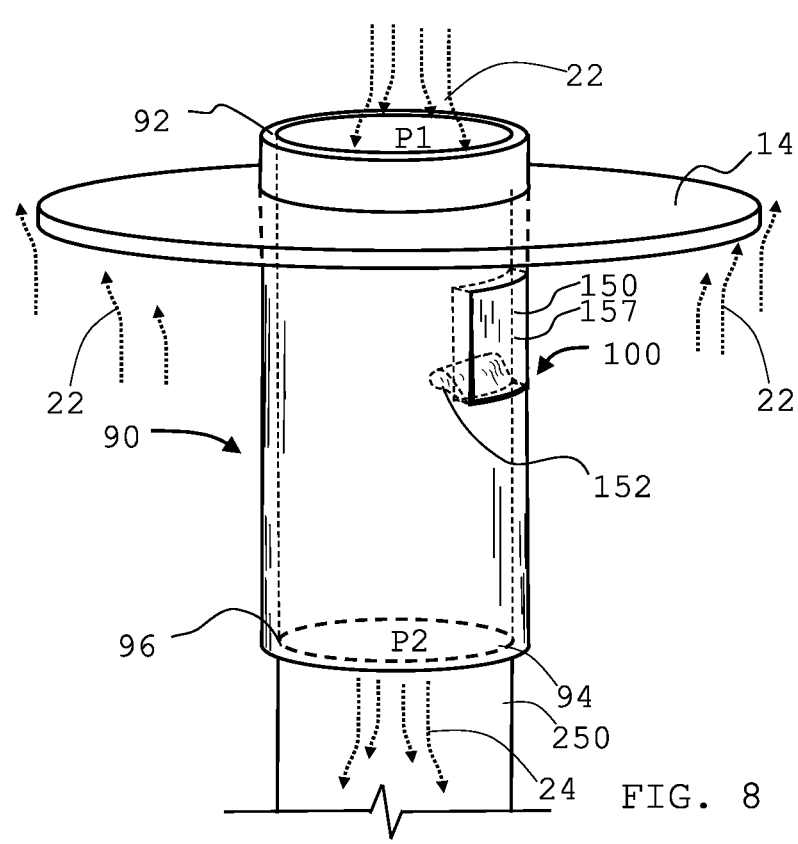
FIG. 8 is another perspective view of one of the embodiments of the invention when in unlocking status.

Referring to FIGS. 7 and 8, another embodiment of the locking mechanism, wherein the locking mechanism further comprises a locking arm 157 hinged on an upper edge of the locking mechanism opening 150 and a locking diaphragm 152 configured to form a seal with the locking arm 157 and the locking mechanism opening 150, wherein the locking arm 157 is configured to be above the sealing member 14 of the valve 10, and wherein the locking arm 157 moves toward the locking mechanism opening 150 when the locking diaphragm 152 moves inwardly to the locking mechanism opening 150. When there is a negative second pressure P2 and a piping air flow 24 is drawn into the piping system 252, which causes a drop of pressure in the locking mechanism opening 150 and pulls in the locking diaphragm 152 moves back to the locking mechanism opening 150. In one embodiment, the locking arm 157 can be made of any material, such as plastic, rubber, metal, glasses, but preferably a rigid material to form a slope to allow the sealing member to slide down. The locking arm 157 can be configured to form an angle between the external house of the locking mechanism housing 90 and the locking arm 157 so that the sealing member can slide down the angled slope but not go up over the locking arm 157.

Figure 9:
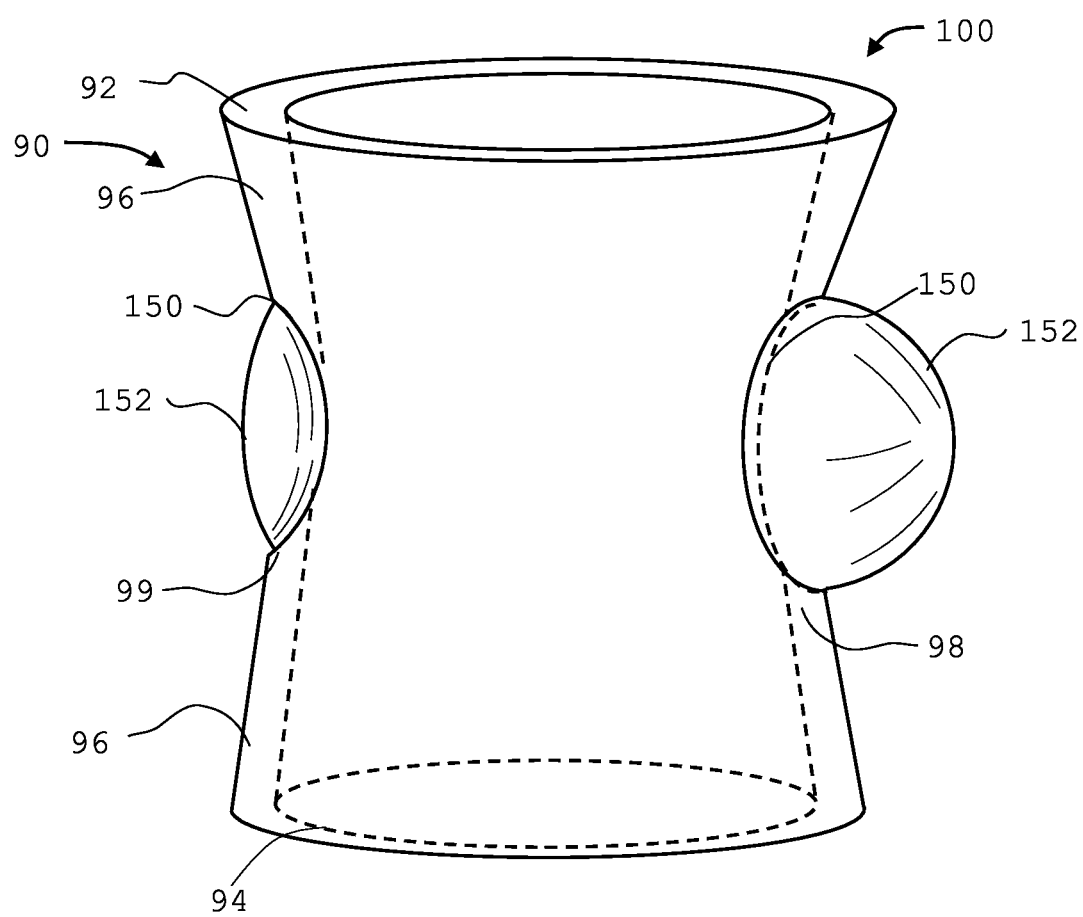
FIG. 9 is another perspective view of one of the embodiments of the invention.

Referring to FIG. 9, in one embodiment of the apparatus 100, the body 96 of the locking mechanism housing 90 further comprises at least one narrowed portion 99, wherein the at least one locking mechanism opening 150 is formed on the at least one narrowed portion. As shown in FIG. 9, in one embodiment, there are two locking mechanism openings 150 and two locking diaphragms 152 formed on two opposite sides of the locking mechanism housing 90 and on the narrowed portions 99.

Figure 10:
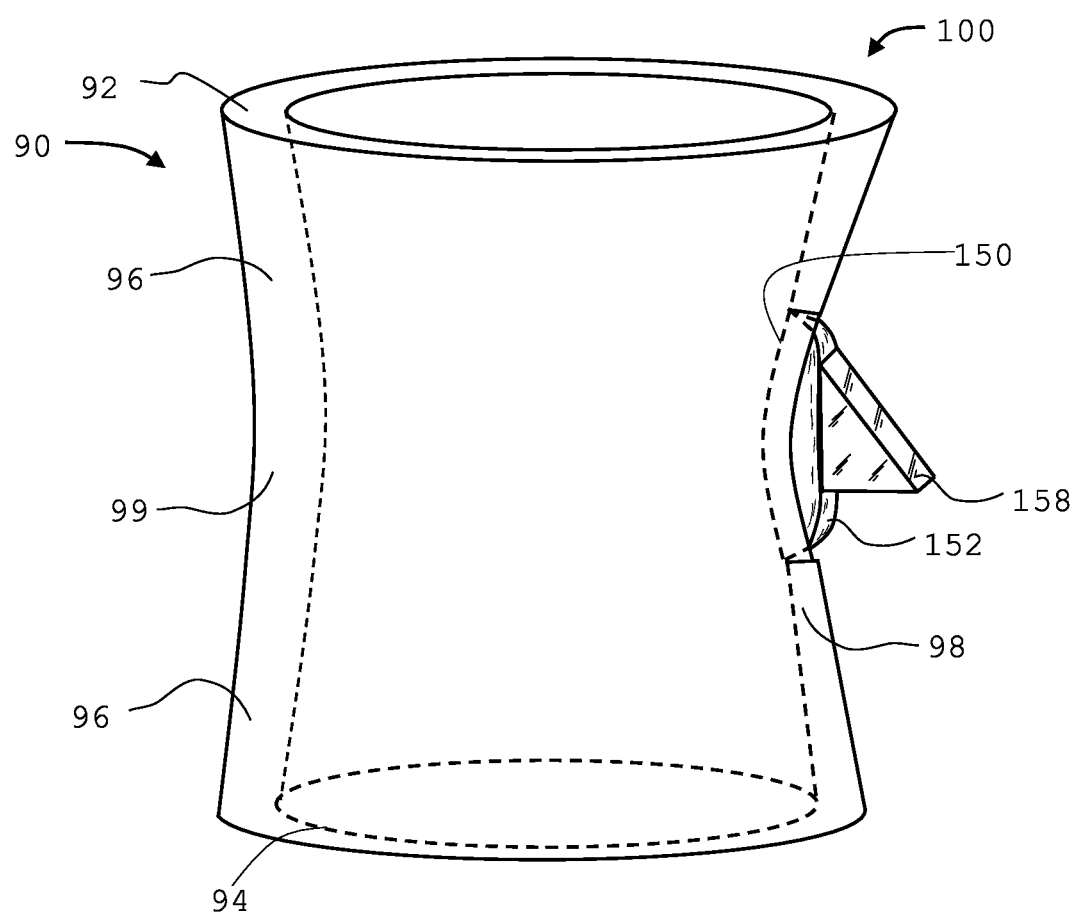
FIG. 10 is another perspective view of one of the embodiments of the invention.

Referring to FIG. 10, in one embodiment of the apparatus 100, wherein the locking mechanism further comprises a locking diaphragm 152 sealed around the locking mechanism opening 150, a pin 158 attached on the locking diaphragm 152 outwardly the locking mechanism housing 90, wherein the pin 158 is configured to be above the sealing member 14 of the valve 10, and wherein the pin 158 toward the locking mechanism opening 150 when the locking diaphragm 152 moves inwardly to the locking mechanism opening 150. The pin 158 can be in any shape preferably a triangle that has a sloped side to allow the sealing member 14 to slide down but prevent the sealing member to go up before the locking diaphragm 152 and the pin 158 retreats back to the locking mechanism opening 150.

Figure 11:
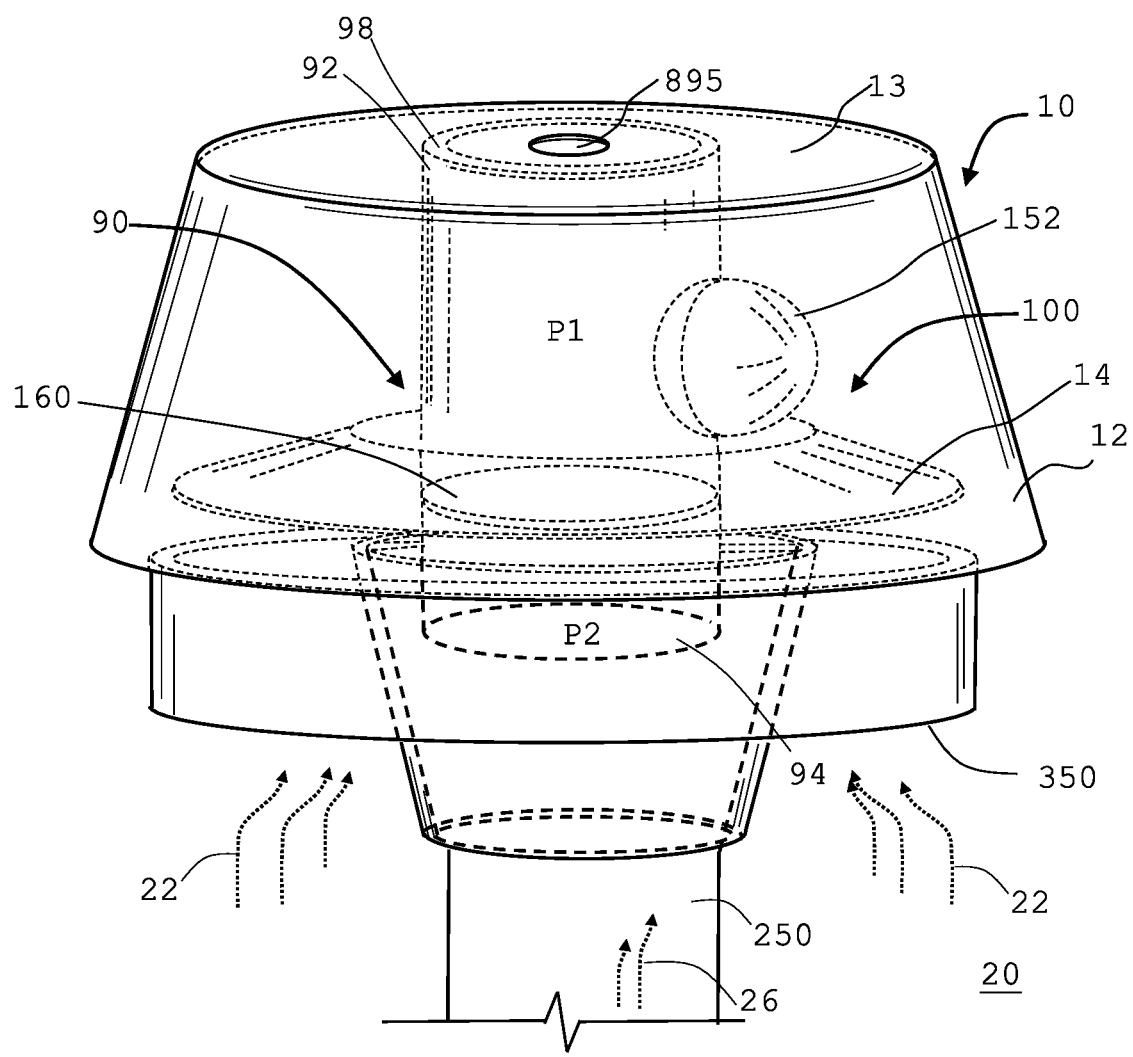
FIG. 11 is a perspective view of one of the embodiments of the invention with a bleeding opening.
Figure 12:
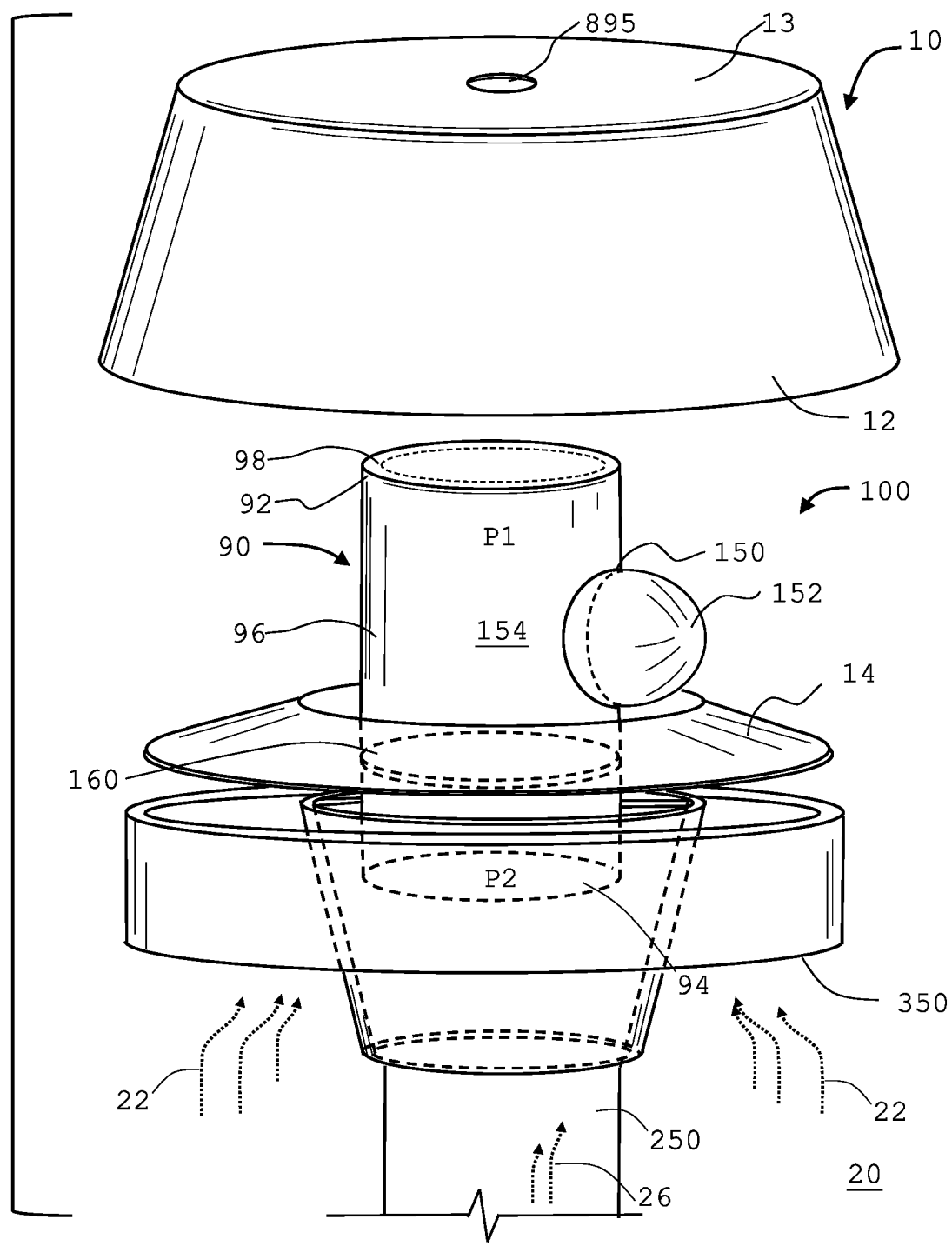
FIG. 12 is a partially explosive, perspective view of one of the embodiments of the invention with a bleeding opening.

Referring to FIGS. 11 and 12, one embodiment of an apparatus 100 for locking a valve 10, wherein the valve housing 12 further comprises a valve housing enclosed end 13, and wherein the upper end 92 of the locking mechanism housing 90 contacts with a valve housing enclosed end 13 to form the locking mechanism housing end 98; and wherein a bleeder opening 895 is formed on the valve housing enclosed end 13 and/or the locking mechanism housing end 98. The purpose for the bleeder opening 895 and the housing enclosed end 13 is that the opening size of the bleeder opening 895 determines the rate at which when a negative pressure that exists in the zone of the second pressure P2 is released and no longer exists the vacuum pressure in the air that was taken in to the bleeder opening 895 to the zone of the first pressure P1 is released slowly so that the locking diaphragm 152 does not return to the rest position rapidly. Thereby, this will create a delay in the locking diaphragm 152 returning to the locked position and this will provide time for the sealing member 14 to drop back down below the locking diaphragm 152 before the locking diaphragm 152 returns to the rest position, which would prevent the sealing member 14 from being able to drop below or move up the locking diaphragm 152 before the locking diaphragm 152 resumes the rest position and therefore the locked position. The bleeder opening 895 can be a one way or a two way flow passage opening or can also serve as a port to fill and contain a positive pressure and or an ideal gas or a noble gas between the compression diaphragm 160 and the valve housing enclosed end 13 (and/or the locking mechanism housing end 98 when practically the valve housing enclosed end 13 and the locking mechanism housing end 98 essentially become one structure together) to effect the zone of the first pressure P1 as in the zone of second pressure P2 experiences different variable pressures both negative and positive those pressures with in the zone of the second pressure P2 can be designed to act differently with the zone of the first pressure P1 based on the pressures and/or gases that exist within the zone of the first pressure P1.

The valve 10 may be any type of valve that regulates the flow, air or liquid, in and out of a piping system or an enclosed system, such as air admittance valve or flow regulating valve. The shape of the locking mechanism opening 150 may comprise circle, rectangle, square, oval, triangle, pentagon, hexagon, octagon, rhombus, trapezoid, irregular shape, or any combination of thereof. The shape of the locking mechanism housing 90 may comprise any shapes, such as but not limited to circle, rectangle, square, oval, triangle, pentagon, hexagon, octagon, rhombus, trapezoid, irregular shape, or any combination of thereof. The location of the locking mechanism housing 90 can be in the center or on the side in a valve housing or out of a valve housing. The material of the locking mechanism housing 90 may comprises any materials suitable for pipe fittings, such as but not limited to aluminum, cast iron, copper, plastic, steel, brass, malleable, or alloy, or any combination thereof. The material for the locking diaphragm 152 and compression diaphragm 160 may be any pliable or bendable material, such as soft plastic, rubber, polymer, latex, neoprene, or pliable metals, or any combination of the therefore, but preferable the rubber. The pin 158 and the locking arm 157 may comprise of any rigid or semi-rigid material such as but not limited to aluminum, cast iron, copper, plastic, steel, brass, malleable, alloy, rubber, plastic, wood, or any combination thereof. The collar guide 156 may comprise pliable material, rigid material, or a combination thereof. Negative pressure means a pressure relatively less than the ambient air pressure or a decreased pressure that is caused by a vacuum force or a suction force in an enclosed system or a piping system.

While the present disclosure has been described with reference to preferred embodiments thereof, it is to be understood that the disclosure is not limited to the preferred embodiments and constructions. The present disclosure is intended to cover various modification and equivalent arrangements. In addition, the foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What claimed is:

1. An apparatus for locking a sealing member of a valve in a piping system or an enclosed system, comprising: a locking mechanism housing having an upper end, a lower end opposed to the upper end, and a body between the upper end and the lower end; the sealing member; a valve housing; wherein the locking mechanism housing, and the sealing member are disposed inside the valve housing; wherein the valve further comprises an inlet for communication with an ambient environment and an outlet for communication with the piping system or the enclosed system; wherein the lower end of the locking mechanism housing communicates with the outlet of the valve; wherein an enclosed zone is defined by the locking mechanism housing; wherein a first pressure exists in the enclosed zone, wherein a second pressure exists in the outlet; wherein the valve housing further comprises a valve housing enclosed end; and wherein a bleeder opening is formed on the valve housing enclosed end;

wherein the valve further comprises a locking mechanism housing end enclosed on the upper end and communicating with the bleeder opening, a compression diaphragm below a locking mechanism opening and sealed inside the locking mechanism housing; and wherein the bleeder opening serves as a port to fill an ideal gas or a noble gas in the locking mechanism housing between the compression diaphragm and the valve housing enclosed end.

2. The apparatus of claim 1, wherein the bleeder opening is also for communicating with the ambient environment.

3. The apparatus of claim 1, wherein the enclosed zone is further defined by the upper end and the compression diaphragm.

4. The apparatus of claim 3, wherein the compression diaphragm moves inwardly to the enclosed zone when the second pressure is greater than the first pressure, and wherein the compression diaphragm moves outwardly from the enclosed zone when the first pressure is greater than the second pressure.

5. The apparatus in of claim 1, wherein a locking mechanism is disposed in the locking mechanism opening.

* * * * *